No. 865,819. PATENTED SEPT. 10, 1907.
W. H. POWELL.
MOTOR CONTROL SYSTEM.
APPLICATION FILED JAN. 28, 1907.
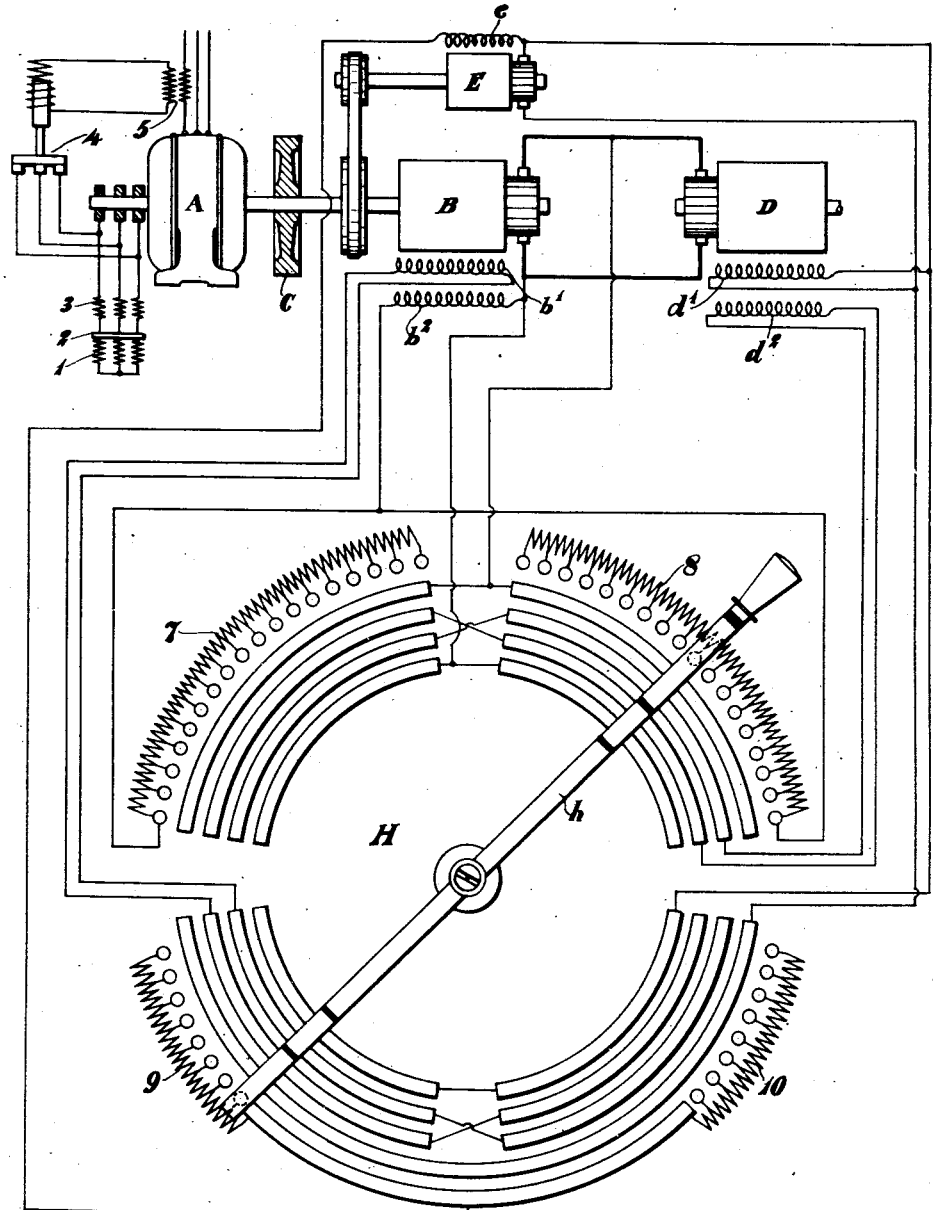
Witnesses
Inventor
William H. Powell
By Chas. E. Lord
Attorney

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

No. 865,819.　　　Specification of Letters Patent.　　　Patented Sept. 10, 1907.

Application filed January 28, 1907. Serial No. 354,504.

*To all whom it may concern:*

Be it known that I, WILLIAM H. POWELL, a citizen of the United States, residing at Norwood, in the county of Hamilton and State of Ohio, have invented certain new and useful Improvements in Motor-Control Systems, of which the following is a full, clear, and exact specification.

My invention relates to motor control systems, and especially to control systems for electric motors requiring great variations in speed in minimum time.

Systems of motor control have been proposed in which the motor is controlled in speed and direction by varying the value and direction of the electromotive force of the generator supplying said motor. In all of these it has been necessary to obtain all or the greater part of the excitation of the generator from a separate source, as the electromotive force of a purely self-excited generator having a constant direction of rotation is ordinarily not reversible. Other systems have been proposed in which the working motor is controlled by varying the value only of the electromotive force of the generator supplying said motor, the reversal of the motor being obtained by means of a reversing switch between its armature and the main generator. In these systems it is possible to have a purely self-excited generator for supplying such motor, but it may sometimes be objectionable to have a reversing switch in the motor armature circuit.

It is the object of my present invention to provide a system in which the speed and direction of the working motor is controlled by varying the value and direction of the electromotive force of a generator which is practically fully self-excited, the reversal of the electromotive force of this generator being obtained by reversing its residual magnetism.

My invention therefore broadly comprises the method of controlling a generator which consists in determining the polarity of its field by current from a separate source, varying its field by current from the generator armature, and inversely varying the electromotive force of said separate source.

More specifically my invention comprises a system of motor control consisting of a motor, a main generator for supplying the armature of said motor, said generator having a self-excited field winding and a separately-excited field winding, and a controller for setting the polarity of the generator field by the separately-excited winding, and for varying the generator electromotive force by the self-excited winding.

Many other features of my invention will appear from the following description and accompanying drawings and will be particularly pointed out in the appended claims.

The single figure of the drawing shows diagrammatically one embodiment of my invention.

In this figure, A is an electric motor of the three-phase induction type, though obviously other forms of the motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength of the primary circuit of the motor, as through a series transformer 5. Other means for varying the speed of the motor A may be used if desired.

Two generator armatures B and E are driven by the motor A, being either directly connected thereto, as is armature B, or belted thereto, as is armature E. Either or both armatures may be driven by the motor A in either manner, or, if desired, in any other manner. On the common shaft of the motor A and the generator B is a heavy fly-wheel C. The generator B supplies current to the armature D of the working motor. The motor D may be used to drive any desired machinery.

The generator B has two assisting field coils $b'$ and $b^2$ and the motor D two assisting field coils $d'$ and $d^2$. The coils $b'$ and $d'$ are separately excited from the exciter E, while the coils $b^2$ and $d^2$ are excited from the armature B. The exciter E is preferably self-excited as by a single field coil $e$.

A main controller H is arranged to vary the resistances in circuit respectively with the coils $b^2$ and $e$, to reverse the current through the coil $b'$, and to reverse the connections of the coil $d^2$ to maintain the current in this coil in the same direction regardless of reversals of the electromotive force of the generator B. Although the connections of the coil $b^2$ are not reversed, the current in this coil is reversed because of the reversal of the electromotive force of generator B. The arm or handle $h$ of the controller H is divided into several electrically distinct parts. There are two sets of variable resistances, one set of which, resistances 7 and 8, is for the circuit of field coil $d^2$, and the other set, resistances 9 and 10, for the circuit of field coil $e$. If desired, instead of having the resistances 7 and 8 separate the contacts of one may be connected to the corresponding contacts of the other, one of these resistances being omitted. The same cross connection may be applied to the contacts of the resistances 9 and 10.

The controller is arranged so that when the arm $h$ is moved on one side of the vertical the resistances 7 and 10 are varied to control the speed of the motor D in one direction, and when moved on the other side of the vertical the resistances 8 and 9 are varied to control the motor D in the other direction. The direction of current through the coil $b'$ is reversed as the arm $h$ passes through its vertical position, at which time the electromotive force of the generator B is at or near a minimum and substantially the full field excitation of this generator is obtained from the separately excited coil $b'$.

The operation of the system is as follows:—The primary circuit of motor A is closed and the motor started by moving the bar 2 to cut out the starting resistance 1. The switch 4 is held open by its solenoid at this time because of the heavy current required for starting the motor. If desired, other means may be used to insure the open condition of this switch during starting. After the motor has gained sufficient speed and the starting resistance has been cut out, the solenoid switch is allowed to close to cut out resistance 3 because of the decrease in the primary current of motor A. The fly-wheel C and generator armatures B and E are also started with the motor A, and the fly-wheel stores mechanical energy by its rotation. During this starting, the arm $h$ is preferably in its vertical or "off" position. The field coils $d'$ and $e$ are now at their strongest, and the field coils $b'$, $b^2$ and $d^2$ are deënergized. The arm $h$ is now gradually moved from the vertical toward the horizontal in the proper direction to give the motor G the desired direction of rotation. As this arm moves, say clockwise, it first completes the circuits of the coils $b'$, $b^2$ and $d^2$, the coil $b'$ immediately rising to full strength, while the coils $b^2$ and $d^2$ remain comparatively weak because the electromotive force of the generator B is practically negligible. Thus the direction of current in the coil $b'$ determines the initial polarity of the field of the generator B. If the desired direction of rotation of the motor D is the same as in its last previous operation the magnetism due to the coil $b'$ merely reinforces the residual magnetism of the generator field. If the desired direction of rotation of the motor D is the reverse of that of its last previous operation, the current in the coil $b'$ reverses the residual magnetism of the generator field. In either case, as the generator B begins to build up the field coil $b^2$ assists the field coil $b'$ to more strongly excite the generator field. As the arm $h$ is moved farther from the vertical, the resistance 8 is gradually cut out of circuit to increase the strength of the field coil $b^2$, thus raising the electromotive force of the generator armature B and increasing the speed of the motor D. The increase of the electromotive force of the armature B also increases the strength of the motor field coil $d^2$, thus strengthening the total motor field somewhat, to give a maximum torque for starting.
Continued movement of the arm $h$ toward the horizontal position also gradually cuts the resistance 9 into circuit with the exciter field coil E, thus weakening said coil and lowering the exciter electromotive force to weaken the generator field coil $b'$ that said generator may become more fully self-exciting, and to weaken the motor field coil $d'$. Preferably the coil $d$ is weakened more rapidly than the coil $d^2$ is strengthened in order to weaken the total motor field to increase the speed of the motor D. The speed which the motor D acquires depends upon the extent of movement of the arm $h$, full speed being obtained when the full resistance 8 has been cut out and the full resistance 9 cut in. If desired the circuit of the coil $e$ may be broken as the arm $h$ reaches or approaches its limiting position, or the circuit of the coil $b'$ may be broken at any time after the residual magnetism of the generator field has been reversed. The relation between the coils $b'$ and $b^2$ is preferably such that after the generator B has begun to pick up the greater part of the excitation of the generator field is due to the coil $b^2$, thus making this generator practically fully self-excited. The relation between the motor field coils $d'$ and $d^2$ is preferably such that the coil $d^2$ at full strength is weaker than the coil $d'$ at full strength, so that high speeds of the motor D may be more readily obtained on account of the weaker motor field. However, these relations may be varied as desired.

If the load is heavy the working motor D requires more power for its starting than the motor A can furnish. The current rising in the primary of the transformer 5 by reason of this heavy load, the switch 4 is opened, thus inserting resistance 3 into the rotor circuit of motor A. This increases the slip of motor A and permits said motor to slow down, thus allowing the fly-wheel C to give up some of the mechanical energy it has stored, which energy helps the motor A to drive the generator B to supply electrical energy at the rate demanded by the motor D to drive the load.

As the arm $h$ is moved backward toward the vertical, the motor D is caused to act as a generator to supply current to the armature B, the latter now serving as a motor to help restore energy to the fly-wheel C. There is a powerful braking effect upon the working motor due to its acting as a generator. The diminished current in the primary of transformer 5 also causes the solenoid switch 4 to close, thereby increasing the speed of motor A so that the latter may also supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied. Any desired means may be used to take up the field discharge of the coils which have their circuits interrupted. When the arm $h$ is moved counter-clockwise from the vertical the above cycle is repeated, save that the working motor D rotates in the other direction because the direction of current in its armature is reversed.

I have described my invention in what I now consider to be its preferred form but many details in the precise arrangements shown and described may be varied without departing from the spirit and scope of my invention. All such obvious modifications I aim to cover in the claims.

What I claim as new is:—

1. The method of controlling the value and direction of the electromotive force of a generator, which consists in determining the polarity of its field by current from a separate source, varying its field by current from the generator armature, and inversely varying the electromotive force of said separate source.

2. The method of reversing the electromotive force of a generator, which consists in reversing the residual magnetism of its field magnet by current from a separate source, further exciting the field magnet in this reverse direction by current from the generator armature, and inversely varying the amount of such further excitation and the electromotive force of said separate source.

3. The method of varying the value and direction of the electromotive force of a generator, which consists in energizing its field magnet from its armature and from a separate source of current jointly, varying each of the two components of its field magnetism, and reversing the residual magnetism of its field magnet by current from the separate source when the electromotive force of the generator armature is at or near a minimum.

4. The method of controlling an electric motor, which consists in supplying its armature from a generator, determining the polarity of the generator field by current from a separate source, varying the field strength of the generator by current from the generator armature, and inversely varying the voltage of said separate source.

5. The method of controlling an electric motor, which consists in supplying it from a generator, energizing the field of the generator jointly from its own armature and from a separate source of current, varying the voltages of said generator and said separate source, and reversing the current supplied to the generator field magnet from the separate source of current.

6. The method of controlling an electric motor, which consists in supplying its armature from a generator, supplying its field jointly from said generator and a separate source of current, supplying the field of the generator jointly from its own armature and a separate source of current, and so regulating the field of the generator that the current from the separate source determines the polarity of said field and the current from the generator armature the strength of said field.

7. The method of controlling the speed and direction of an electric motor, which consists in supplying the motor from a generator, energizing the field of the generator from its armature and from a separate source of current jointly, varying each of the two components of its field magnetism, and reversing the residual magnetism of its field magnet by current from the separate source when the electromotive force of the generator armature is at or near a minimum.

8. In combination, a generator, a separate source of current, separate field windings for the generator supplied respectively by the generator armature and the separate source of current, and a controller for connecting the separately excited field winding of the generator to determine the polarity of the generator field.

9. In combination, a generator having a self-excited field winding and a separately-excited field winding, and a controller for setting the polarity of the generator field by the separately excited field winding and for varying the generator electromotive force by the self-excited field winding.

10. In combination, a generator, a separate source of current, and a controller for connecting the separate source to determine the polarity of the generator field, for varying the field strength of the generator by current from the generator armature, and for inversely varying the electromotive force of said separate source.

11. In combination, a generator, a separate source of current, and means for connecting the generator field magnet to the separate source to reverse the residual magnetism of the former and to the generator armature for further excitation, and for inversely varying the amount of said further excitation and the electromotive force of the separate source.

12. In combination, a generator, a separate source of current, means for energizing the generator field jointly from its armature and from said separate source, and means for varying each of the two components of the generator field magnetism and for reversing its residual field magnetism by current from the separate source when the electromotive force of the generator armature is at or near a minimum.

13. In a system of motor control, a motor, a generator for supplying the armature of said motor, a separate source of current, and means for determining the polarity of the generator field by current from the separate source, for varying the field strength of the generator by current from the generator armature, and for varying the electromotive force of said separate source inversely to the field strength of the generator.

14. A motor control system, comprising an electric motor, a generator for supplying said motor, a separate source of current, and means for connecting the generator field so that it is energized jointly from the generator armature and from said separate source, for varying the voltages of said generator and said separate source, and for reversing the current supplied to the generator field magnet from the separate source of current.

15. A motor control system, comprising an electric motor, a generator for supplying the armature of said motor, a separate source of current, connections for energizing both the motor field and the generator field jointly from said generator armature and said separate source of current, and means for so regulating the field of the generator that the current from the separate source determines the polarity of said field and the current from the generator armature the strength of said field.

16. In combination, an electric motor, a generator for supplying said motor, a separate source of current, connections whereby the field of the generator is energized jointly from the generator armature and the separate source of current, and means for varying each of the two components of the generator field magnetism and for reversing the residual magnetism of said field by current from the separate source.

17. In combination, a generator, a separate source of current, two sets of field windings for the generator supplied respectively by the generator armature and the separate source of current, and a controller for varying the resistance in circuit with said self-excited field windings and for connecting said separately-excited field windings to determine the polarity of the generator field.

18. A system of motor control, comprising a motor, a generator for supplying the armature of said motor, said generator having a self-excited field winding and a separately excited field winding, and a controller for setting the polarity of the generator field by the separately-excited field winding and for varying the generator electromotive force by the self-exciting winding.

19. In combination, a generator, a motor the armature of which is supplied by said generator, a separate source of current, a field coil for the motor supplied by the generator armature, field coils for the generator supplied respectively by the generator armature and the separate source of current, and a controller for connecting the separately excited field winding of the generator to determine the polarity of the generator field.

20. In combination, a generator, a motor the armature of which is supplied by said generator, a separate source of current, a field coil for the motor supplied by the separate source, field coils for the generator supplied respectively by the generator armature and the separate source of current, and a controller for connecting the separately excited field winding of the generator to determine the polarity of the generator field.

21. A motor control system comprising a motor, a generator for supplying the armature of said motor, separately excited field coils for the generator and motor respectively, self-excited field coils for the generator and motor respectively, and means for varying the resistance in circuit with the self-excited field coil of the generator and for reversing the current in the separately excited field coil of the generator.

22. A system of motor control, comprising a source of current, a motor supplied thereby, a generator driven by said motor, a second motor the armature of which is supplied by said generator, connections whereby different coils of the generator field magnet are respectively self-excited and separately-excited, and means for varying the field excitation of the generator and for reversing the current supplied to the separately-excited field coils of the generator.

23. A system of motor control, comprising a source of current, a motor supplied thereby, two generators driven by said motor, a second motor the armature of which is supplied by one of said generators, and having field coils respectively supplied by the two generators, and means for reversing the residual magnetism of the armature-supplying generator.

24. A system of motor control, comprising a source of current, a motor supplied thereby, a generator driven by said motor, a fly-wheel mechanically connected to said generator, field coils for the generator which are respectively separately-excited and self-excited, means for reversing the magnetism of the generator field by reversing the connections of the separately excited field coils, and means for causing the motor to drop in speed when the load thereon exceeds a predetermined value.

25. A system of motor control, comprising a source of current, a motor supplied thereby, a generator driven by said motor, a second motor supplied by said generator, field coils for said generator which are respectively separately excited and self-excited, and means for varying the amount of the self excitation and for reversing the separate excitation of said generator.

26. A system of motor control, comprising a source of current, a motor supplied thereby, a generator driven by said motor, a fly-wheel mechanically connected to said motor, a second motor supplied by said generator, field coils for said generator which are respectively separately excited and self-excited, means for varying the amount of the self excitation and for reversing the separate excitation of said generator, and means for causing the first motor to rise in speed when the load thereon falls below a predetermined value.

In testimony whereof I affix my signature, in the presence of two witnesses.

WILLIAM H. POWELL.

Witnesses:
  GEO. B. SCHLEY.
  FRED J. KINSE.